United States Patent [19]
Kunz

[11] Patent Number: 5,553,906
[45] Date of Patent: Sep. 10, 1996

[54] FLOOR AND SIDE WALL CONNECTORS

[75] Inventor: James R. Kunz, Riverside, Calif.

[73] Assignee: Fleetwood Enterprises, Inc., Riverside, Calif.

[21] Appl. No.: 280,600

[22] Filed: Jul. 26, 1994

[51] Int. Cl.⁶ .................................................. B62D 27/00
[52] U.S. Cl. .......................... 296/29; 296/203; 296/205; 296/164; 403/263; 52/272; 52/731.3
[58] Field of Search ..................... 296/29, 30, 191, 296/156, 164, 203, 205; 52/272, 281, 282.1, 282.3, 282.4, 732.2, 731.3, 731.5, 730.5; 105/397; 403/298, 245, 263, 331, 320

[56] References Cited

U.S. PATENT DOCUMENTS

| | | | |
|---|---|---|---|
| 2,382,376 | 8/1945 | Black | 296/29 |
| 2,546,290 | 3/1951 | Anderson . | |
| 3,529,394 | 9/1970 | Wilkins | 52/282.3 X |
| 3,683,576 | 8/1972 | Sikes | 52/272 X |
| 3,798,859 | 3/1974 | de Jong | 52/282.3 X |
| 3,968,989 | 7/1976 | Schippers | 296/29 |
| 3,994,105 | 11/1976 | Jamison et al. | 52/272 X |
| 4,542,933 | 9/1985 | Bischoff | 296/164 |
| 4,787,670 | 11/1988 | Bentz | 296/190 |
| 5,042,395 | 8/1991 | Wackerle et al. | 52/282.3 X |
| 5,131,714 | 7/1992 | Evans, Sr. et al. | 296/203 X |
| 5,209,541 | 5/1993 | Janotik | 296/29 |
| 5,218,792 | 6/1993 | Cooper | 296/29 X |
| 5,271,687 | 12/1993 | Holka et al. | 296/29 X |

FOREIGN PATENT DOCUMENTS

| | | | |
|---|---|---|---|
| 2607396 | 8/1977 | Germany | 296/203 |
| 1164124 | 6/1985 | U.S.S.R. | 105/397 |
| 8704679 | 8/1987 | WIPO | 296/203 |

Primary Examiner—Dennis H. Pedder
Attorney, Agent, or Firm—Price, Gess & Ubell

[57] ABSTRACT

The present invention provides an improved mobile body construction in the field of motor homes having relatively rigid side walls mounted to a floor above a chassis frame. A frame joint system is provided through use of metallic extruded joint members of a lightweight configuration, while maintaining a relatively rigid frame. These joint members are elongated and can be cut to the individual needs of the particular unit under construction, and comprise a hollow interior subdivided into strengthening polygonal cells. A floor interfacing beam is connected to the floor. The floor interfacing beam has a cross-section including two rectangular polygons and an approximately triangular polygon. The three polygons share a common surface which is parallel to the floor and are juxtaposed adjacent one another. A side wall interfacing beam is connected to the side wall, and has a cross-section including both a polygon having four sides and at least two approximately 90-degree angles and a vertical portion. Both of these shapes are connected to a horizontal surface. The floor interfacing beam is connected to the side wall interfacing beam by bringing a side of the approximately triangular polygon into contact with the common horizontal surface, the vertical portion, and the polygon having four sides.

17 Claims, 2 Drawing Sheets

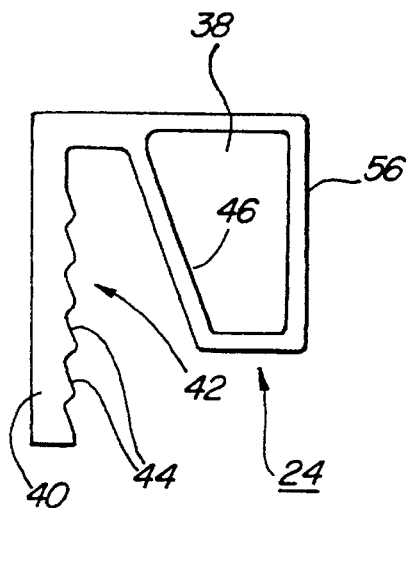
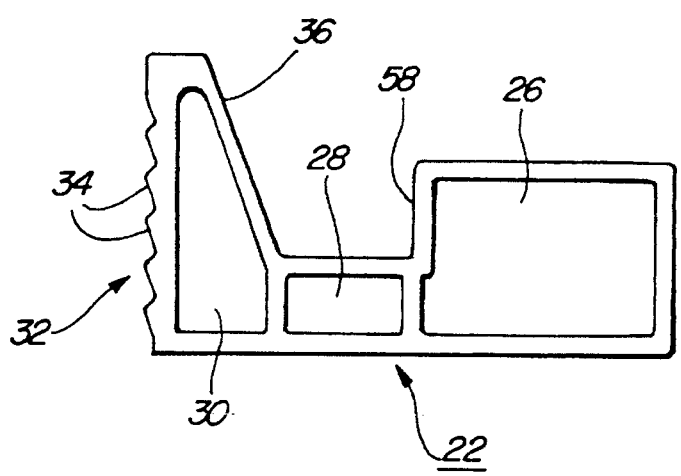
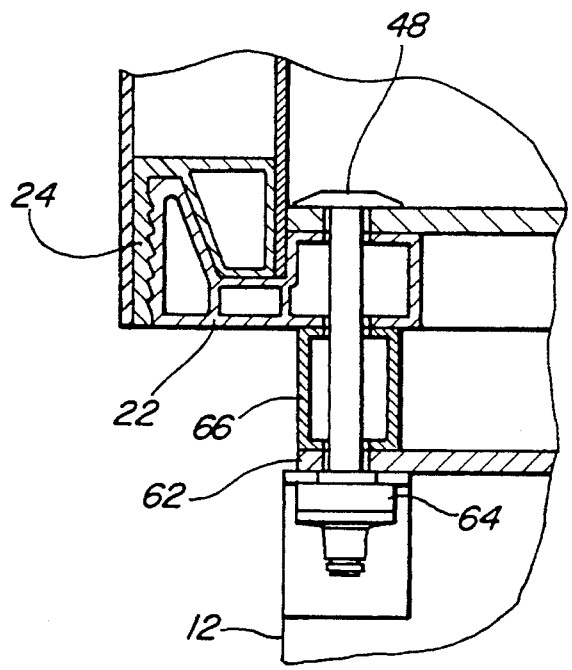

FLOOR AND SIDE WALL CONNECTORS

BACKGROUND OF THE INVENTION

1. Field of the Invention

The present invention relates to construction features of a motor home and, more particularly, to a frame joint system and the component parts of the side walls and floor.

2. Description of Related Art

A motor home shell includes side walls, a roof, and end walls. The motor home shell is supported on a chassis or frame member. Frequently, the frame and joints of such constructions are formed of wood beams and plywood with fiberglass or molded plastic exteriors. Such constructions are relatively labor intensive, do not always provide a uniformity of product, and are subject to transportation flexing problems over the life of the product. Additionally, problems of water leakage frequently occur, along with the stress torquing of mobile structures.

The side walls of the motor home are generally mounted on top of the floor or on the side of the floor. With either of these mountings, cumbersome attachments for aligning the side wall and the floor are often required. The prior art has proposed several approaches for attaching and aligning the side wall to the floor of a motor home. U.S. Pat. No. 2,546,290 discloses wall and floor pieces interlocking by means of single and double flanges on each respective piece. U.S. Pat. No. 4,542,293 discloses corner connections for a camper in which a corner piece has ends which form sockets for the wall and floor panels. Additionally, U.S. Pat. No. 3,683,576 discloses a corner piece having sawtoothed connectors which engage with complementary sawtoothed connectors on wall and ceilings inserts. Other prior art approaches for attaching and aligning motor home side walls and floors are disclosed in U.S. Pat. No. 4,787,670, U.S. Pat. No. 5,209,541, U.S. Pat. No. 3,968,989, and U.S. Pat. No. 2,382,376.

Sealing the connection of the floor to the side wall against the weather further complicates the construction. Many approaches in the prior art use caulking, silicone, and other messy substances for sealing purposes.

The prior art in the field of motor home construction is still seeking convenient and efficient methods and apparatus for attaching and aligning the side wall of the motor home to the floor. A sturdy and easy-to-install connector can reduce manufacturing cost and increase durability of the motor home. Thus, a need exists in the prior art to accurately and efficiently join the side wall to the floor during manufacture.

OBJECTS AND SUMMARY OF THE INVENTION

The present invention provides an improved mobile body construction in the field of motor homes having relatively rigid side walls mounted to a floor above a chassis frame. A frame joint system is provided through use of metallic extruded joint members of a lightweight configuration, while maintaining a relatively rigid frame. These joint members are elongated and can be cut to the individual needs of the particular unit under construction, and comprise a hollow interior subdivided into strengthening polygonal cells. A floor interfacing beam is connected to the floor. The floor interfacing beam has a cross-section including two rectangular polygons and an approximately triangular polygon. The three polygons share a common surface which is parallel to the floor and are juxtaposed adjacent one another. A side wall interfacing beam is connected to the side wall, and has a cross-section including both a polygon having four sides and at least two approximately 90-degree angles and a vertical portion. The polygon and the vertical portion are both connected to a horizontal surface. The floor interfacing beam is connected to the side wall interfacing beam by bringing a side of the approximately triangular polygon into contact with the common surface, the vertical portion, and the polygon having four sides.

The floor interfacing beam and the side wall interfacing beam are fastened to the floor and the side wall, respectively. A slanted interior surface of the floor interfacing beam contacts a slanted interior surface of the side wall interfacing beam, and a first perpendicular serrated exterior surface of the floor interfacing beam contacts a second perpendicular serrated exterior surface of the side wall interfacing beam.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a cross-sectional view of the side wall interfacing beam according to the presently-preferred embodiment;

FIG. 4 is a cross-sectional view of the floor interfacing beam according to the presently-preferred embodiment; and FIG. 5 is a cross-sectional view of the interconnection of the floor and side wall according to the present invention.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art.

Figure 1:
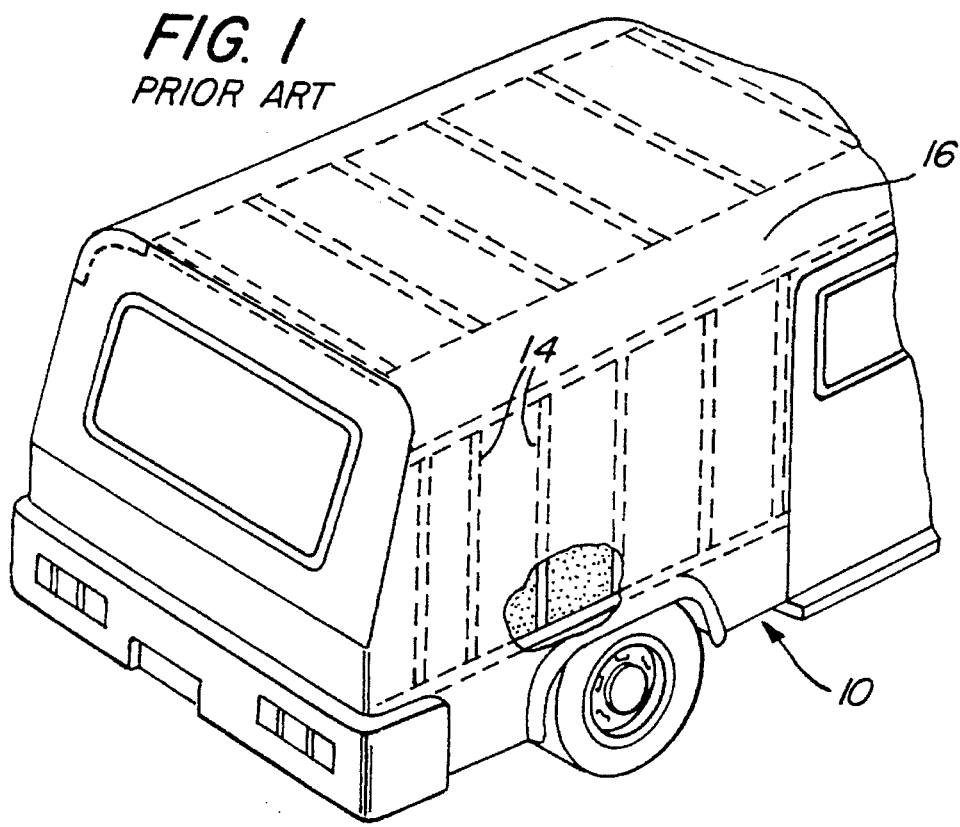
FIG. 1 is a partial side perspective view of a motor home.

FIG. 1 shows a motor home 10 having a self-contained engine (not shown). A chassis frame 12 (FIG. 2) supports an axle, wheel assembly, engine, and drive shaft. The chassis frame 12 may include a single layer of I beams or multiple layers. The manufacturer will generally purchase the chassis frame 12 and construct the motor home frame thereon. A plurality of supporting vertical side support posts 14 of an extruded aluminum hollow square configuration are joined to the chassis frame 12 via the floor and side wall joints of the present invention. An upper horizontal support member 16 of a square, hollow, cross-sectional post configuration is welded onto the top edges of the vertical side support posts 14.

Figure 2:
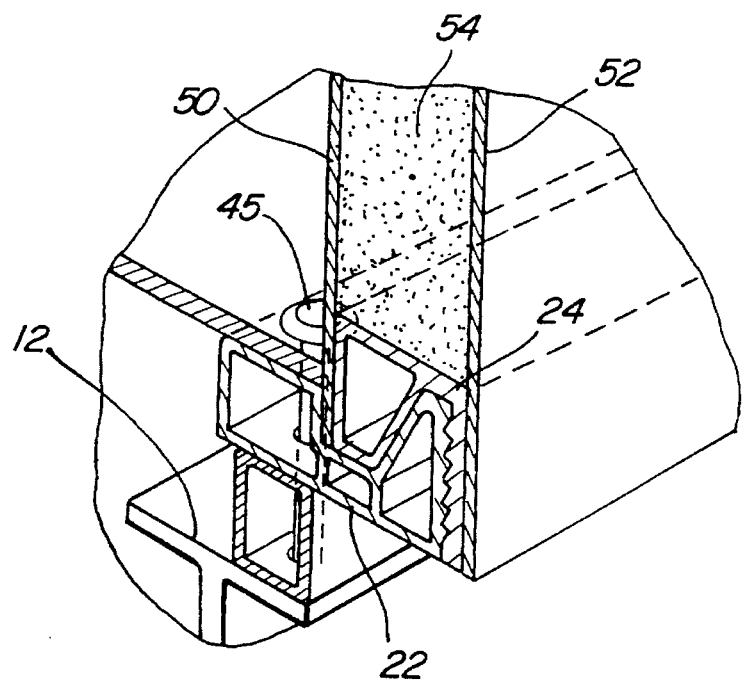
FIG. 2 is a cross-sectional perspective view with a cutaway section showing the construction features of the present invention.

The floor and wall joint assembly of the presently-preferred embodiment comprises a floor interfacing beam 22 and a side wall interfacing beam 24, as shown in FIG. 2. Each of these beams 22 and 24 runs parallel to the upper horizontal support member 16. A cross-sectional view of the floor interfacing beam 22 and the wall interfacing beam 24 is shown in FIG. 2. The floor interfacing beam 22 has a hollow honeycombed interior and is a metal extrusion from aluminum stock. The wall interfacing beam 24 is similarly constructed. As can be seen in FIG. 4, three cross-sectional polygonal cells reside within the hollow interior of the floor interfacing beam 22. The first and second cells 26 and 28 have a rectangular configuration. Another approximately triangular polygon 30 is at one end of the floor interfacing beam 22. The floor interfacing beam 22 has a first perpendicular serrated exterior surface 32 which is adjacent to a side of the approximately triangular polygon 30. Each of the serrations 34 has a side which is parallel to the first slanted interior surface 36.

The side wall interfacing beam 24 has a single hollow cell and is a metal extrusion from aluminum stock. FIG. 3 shows a cross-sectional view of the side wall interfacing beam 24, in which a polygonal cell having four sides and at least two approximately 90-degree angles is illustrated at 38. The side wall interfacing beam 24 includes a vertical portion 40 which has a perpendicular serrated interior surface 42. Each of the serrations of the perpendicular serrated interior surface 42 has a side 44 which is parallel to the second slanted interior surface 46. The second slanted interior surface 46 is parallel to the first slanted interior surface 36 when the beams 22 and 24 are locked.

Turning back to FIG. 2, the floor interfacing beam 22 is secured to the chassis 12 via a bolt 48. The side wall interfacing beam 24 is secured to an interior panel 50 and an exterior panel 52. Insulating and supporting foam 54 is sandwiched between the interior panel 50 and the exterior panel 52. The side wall interfacing beam 24 is preferably 1½ inches wide, and the insulating and supporting foam 54 in the wall is also preferably 1½ inches wide. The interior decorative panel 50 fits into the gap formed between the exterior side 56 (FIG. 3) of the side wall interfacing beam and the interior side 58 (FIG. 4) of the floor interfacing beam 22. The fiberglass exterior panel 52 fits against the exterior side 60 of the vertical portion 40.

In operation, the side wall interfacing beam 24 is placed above the floor and lowered into the floor interfacing beam 22. The serrations 34 and the sides 44 of the respective interfacing beams 22 and 24 engage one another to prevent vertical movement. Additionally, during installation the first slanted interior surface 36 contacts the second slanted interior surface 46. Thus, the side wall interfacing beam 24 can be slid along the first slanted interior surface 36 and the serrations 34 without an excessive amount of force. The side wall interfacing beam slides along the same angle of inclination to engage the serrations 34 of the floor interfacing beam 22 with the slanted sides 44 of the side wall interfacing beam 24. Accordingly, excessive force is not needed and installation is made convenient and easy. Other shapes of teeth or fastening means may be used and, accordingly, are within the scope of the present invention.

When the floor interfacing beam 22 and the side wall interfacing beam 24 are connected, the serrations of the respective beams 22 and 24 are engaged to prevent vertical movement of the side wall interfacing beam 24. Additionally, when items are placed on the decorative interior panel 50, such as cabinets and the ceiling of the motor home, structural support is applied to the side wall interfacing beam 24 to prevent the side wall from moving outwardly. The fiberglass exterior panel 52, for example, prevents the side wall interfacing beam 24 from moving horizontally.

Additionally, a bolt (not shown) is connected through the exterior panel 52, into the vertical portion 40, and through the floor interfacing beam 22 into the approximately triangular polygon 30. This bolt can further prevent horizontal movement of the side wall interfacing beam 24. The serrations, in combination with the fiberglass exterior panel and bolts, prevent the side wall brace from moving horizontally. Since the side wall interfacing beam 24 can only move along a line parallel to the second slanted interior surface 46, vertical movement is prevented. Thus, the cabinets and the ceiling prevent the side wall from moving out, and the teeth prevent the side wall from moving up.

While the prior art relied on fasteners, such as bolts or screws, to hold the braces together, the present invention does not have to rely on such fasteners. The teeth, in combination with the interior and exterior panels 50 and 52, securely fasten the two interfacing beams 22 and 24 even in the absence of bolts. In the presently-preferred embodiment, however, bolts are used to securely hold the external panel onto the side wall interfacing beam 24, as mentioned above. These bolts further prevent the two braces from movement. The bolts do not carry a large amount of shear and tension, as do bolts of the prior art. Rather, the bolts of the presently-preferred embodiment apply force to hold the floor interfacing beam 22 and the side wall interfacing beam 24 into position, instead of taking a large amount of the load between the floor and the side wall.

While the prior art used messy substances such as caulking and silicone for sealing the joint between the floor and side wall, the present invention uses a dry sealant, such as Teflon™ tape. The Teflon™ tape is not sticky, and is compressed between the floor interfacing beam 22 and the side wall interfacing beam 24 when the two beams 22 and 24 are brought together.

Turning to FIG. 5, the wall and ceiling support posts are basically all aluminum, and the chassis frame is steel. Electrolysis may thus occur at the interface of the two dissimilar metals. Additionally, noise and vibration may be transferred from the steel chassis frame 12 into the motor home. To address these problems, the presently-preferred embodiment places a ¼-inch-thick neoprene foam pad 62 between the steel chassis frame 12 and the entire aluminum frame that supports the motor home walls and ceilings. Additionally, the bolt 48 that holds the aluminum box to the steel chassis frame 12 is isolated from vibration using a donut washer 64 that goes around the bolt. A 1¼-inch aluminum tubing 66 is placed between the neoprene foam pad 62 and the floor interfacing beam 22 for spacing.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In a mobile body construction having a floor and a side wall, the improvement of a joint system comprising:

a first rigid elongated hollow joint member comprising a first recessed coupling interface section and a first protruding interface section having a first undulating surface at one end of the first joint member;

a second rigid elongated hollow joint member comprising a second protruding interface section fitting into the first recessed coupling interface section and a second recessed coupling interface section having a second undulating surface complementary to and overlapping the first undulating surface; and means for connecting the second elongated hollow joint member to the side wall and securely fastening the second elongated hollow joint member to the first elongated hollow joint member, wherein the first recessed coupling interface section is larger in width than the second protruding interface section in order to receive a portion of the side wall which locks the respective joint members together.

2. The mobile body construction of claim 1, further including a bolt for connecting the first elongated hollow joint member to the floor, and wherein the first and second elongated hollow joint members perpendicularly secure the side wall to the floor.

3. The mobile body construction of claim 1, the first and second elongated hollow joint members each comprising at least one interior partition.

4. The mobile body construction of claim 1, wherein each of the first and second elongated hollow joint members is a metal extrusion.

5. The mobile body construction of claim 4, wherein each of the first and second elongated hollow joint members is formed of aluminum.

6. The mobile body construction of claim 1, wherein an interior hollow portion of the first elongated hollow joint member is divided into a series of elongated cells.

7. The mobile body construction of claim 6, wherein the second protruding interface section of the second elongated hollow joint member comprises a hollow elongated cell.

8. The mobile body construction of claim 7, wherein the elongated cells of the first and second elongated hollow joint members are polygonal.

9. The mobile body construction of claim 8, wherein a polygonal elongated cell in each of the first and second elongated hollow joints has a truncated triangular cross-section.

10. The mobile body construction of claim 9, wherein the first and second protruding interface sections comprise the two truncated triangular cross-sectioned polygonal elongated cells.

11. The mobile body construction of claim 10, wherein the first and second protruding interface sections each comprise a portion parallel to the side wall.

12. In a mobile housing structure having side walls, at least two side wall panels, and a horizontal floor supported above a chassis, the improvement of a connecting and supporting device comprising:

a rigid floor connector having a first slanted interior surface and a first perpendicular serrated exterior surface relative to the horizontal floor; and a rigid side wall connector having both a second slanted interior surface and a second perpendicular serrated interior surface relative to the horizontal floor; and means for capturing one of said side wall panels within the floor connector, said means including a portion of the side wall connector, which fits within the floor connector, being smaller in width than the corresponding floor connector in such a manner to leave a gap between said connectors for receiving a portion of the one side wall panel, the two serrated surfaces contacting one another to prevent vertical movement when the side wall connector is sandwiched between the two side wall panels and the one side wall panel is fitted within the gap.

13. The mobile housing structure of claim 12, wherein the first and second slanted surfaces contact one another and the first and second serrated surfaces contact one another when the floor connector and the side wall connector are connected together.

14. The mobile housing structure of claim 13, wherein the second perpendicular serrated exterior surface is cantilevered.

15. The mobile housing structure of claim 13, wherein the first and second perpendicular serrated surfaces include first and second teeth, respectively, each respective tooth having a slanted side which is approximately parallel to the two slanted interior surfaces.

16. The mobile housing structure of claim 15, wherein the floor connector and the side wall connector are connected by sliding the second slanted surface along the first slanted surface.

17. The mobile housing structure of claim 16, wherein the floor connector and the side wall connector are connected by further sliding the slanted sides of the first teeth along the slanted surfaces of the second teeth.

* * * * *